No. 786,862. PATENTED APR. 11, 1905.
S. W. WARDWELL.
WINDING MACHINE.
APPLICATION FILED JULY 30, 1901.

8 SHEETS—SHEET 1.

WITNESSES

INVENTOR
Simon W. Wardwell
BY
ATTORNEYS.

No. 786,862. PATENTED APR. 11, 1905.
S. W. WARDWELL.
WINDING MACHINE.
APPLICATION FILED JULY 30, 1901.

8 SHEETS—SHEET 3.

No. 786,862. PATENTED APR. 11, 1905.
S. W. WARDWELL.
WINDING MACHINE.
APPLICATION FILED JULY 30, 1901.
8 SHEETS—SHEET 4.
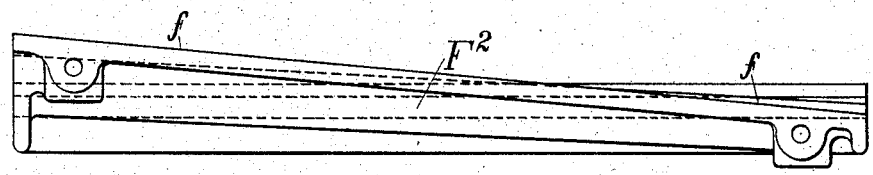
Fig. 4.
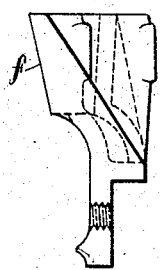 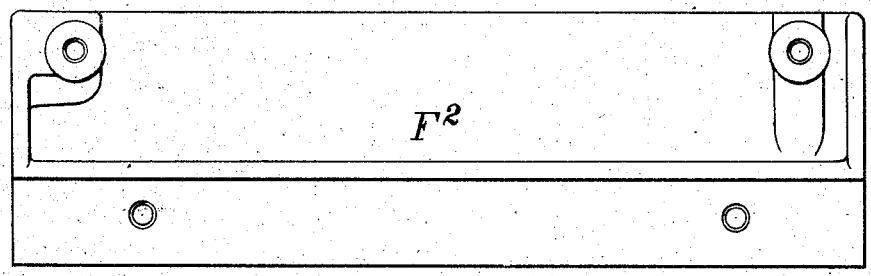
Fig. 5. Fig. 6.
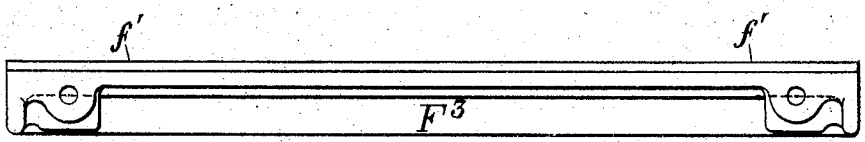
Fig. 7.
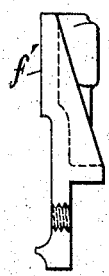 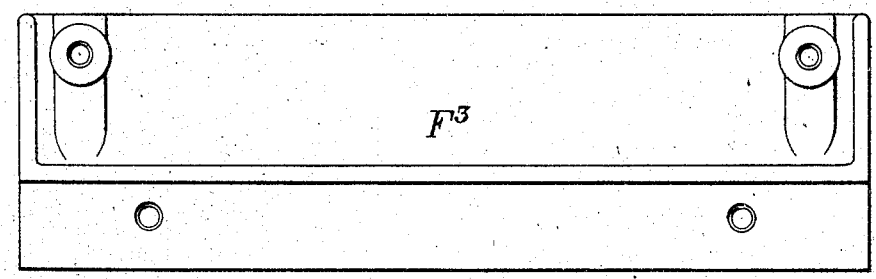
Fig. 8. Fig. 9.
WITNESSES
INVENTOR
Simon W Wardwell
BY Foster & Freeman
ATTORNEYS No. 786,862. PATENTED APR. 11, 1905.
S. W. WARDWELL.
WINDING MACHINE.
APPLICATION FILED JULY 30, 1901.
8 SHEETS—SHEET 5.
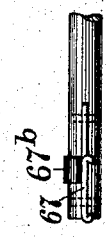
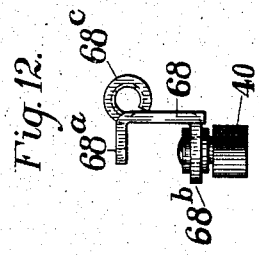
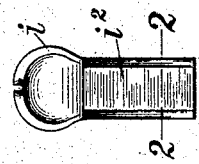
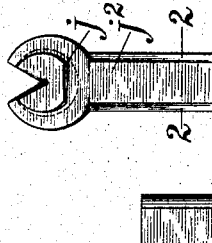
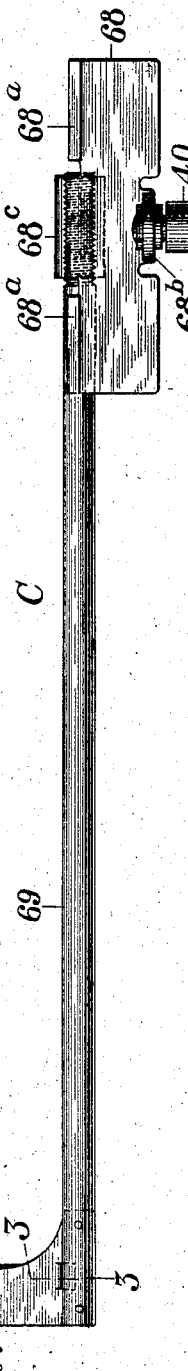
WITNESSES
INVENTOR
Simon W Wardwell
BY
ATTORNEYS.

No. 786,862. PATENTED APR. 11, 1905.
S. W. WARDWELL.
WINDING MACHINE.
APPLICATION FILED JULY 30, 1901.

8 SHEETS—SHEET 6.

WITNESSES

INVENTOR
BY
ATTORNEYS

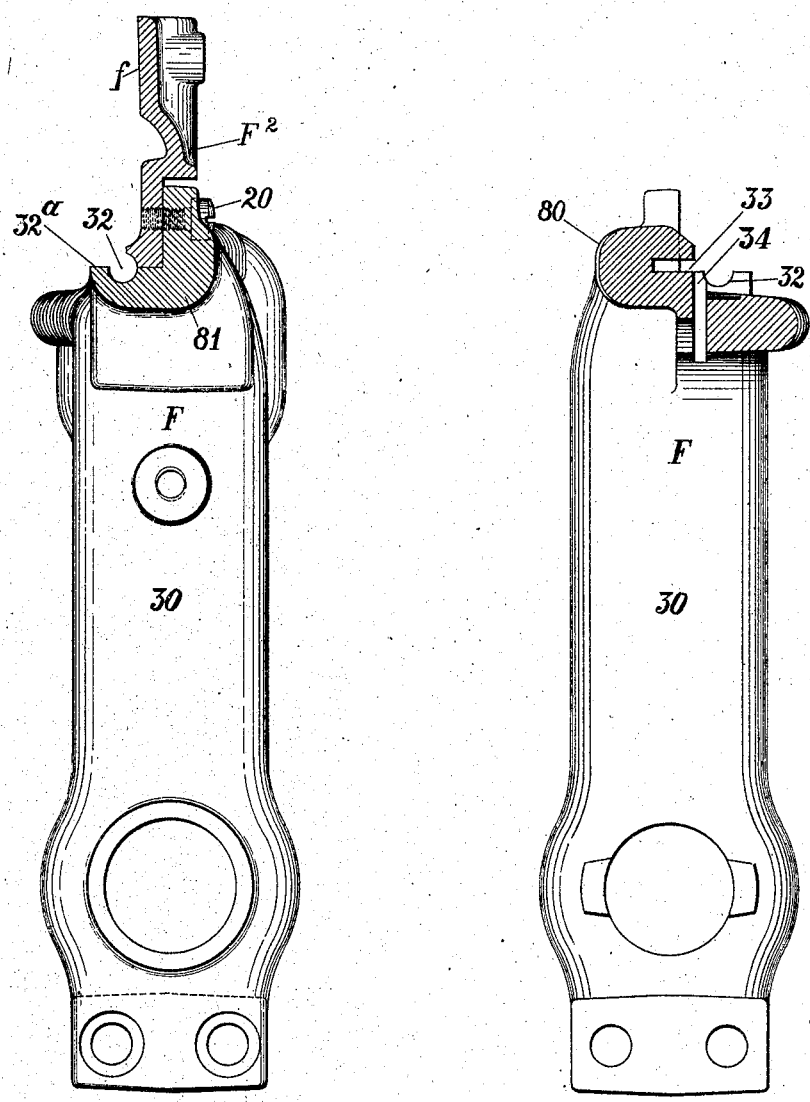

No. 786,862. PATENTED APR. 11, 1905.
S. W. WARDWELL.
WINDING MACHINE.
APPLICATION FILED JULY 30, 1901.

8 SHEETS—SHEET 8.

WITNESSES

INVENTOR
S. W. Wardwell
BY
ATTORNEYS

No. 786,862. Patented April 11, 1905.

UNITED STATES PATENT OFFICE.

SIMON W. WARDWELL, OF PROVIDENCE, RHODE ISLAND, ASSIGNOR, BY MESNE ASSIGNMENTS, TO THE COMMONWEALTH TRUST COMPANY, TRUSTEE, A CORPORATION OF MASSACHUSETTS.

WINDING-MACHINE.

SPECIFICATION forming part of Letters Patent No. 786,862, dated April 11, 1905.

Application filed July 30, 1901. Serial No. 70,253.

*To all whom it may concern:*

Be it known that I, SIMON W. WARDWELL, a citizen of the United States, residing at Providence, Providence county, State of Rhode Island, have invented certain new and useful Improvements in Winding-Machines, of which the following is a specification.

My invention relates to improvements in winding-machines, and particularly to the class of winding-machines employed for winding conical and cylindrical packages, or both.

The object of my invention is to produce a machine of novel and improved structure capable of higher speed and greater winding capacity, less susceptible to wear and derangement, more accessible for lubrication and adjustment, and better provided with devices to insure adequate and effective lubrication, and less expensive to produce.

My invention consists in the various features of construction and arrangement of parts having the general mode of operation substantially as hereinafter set forth.

Figure 1:
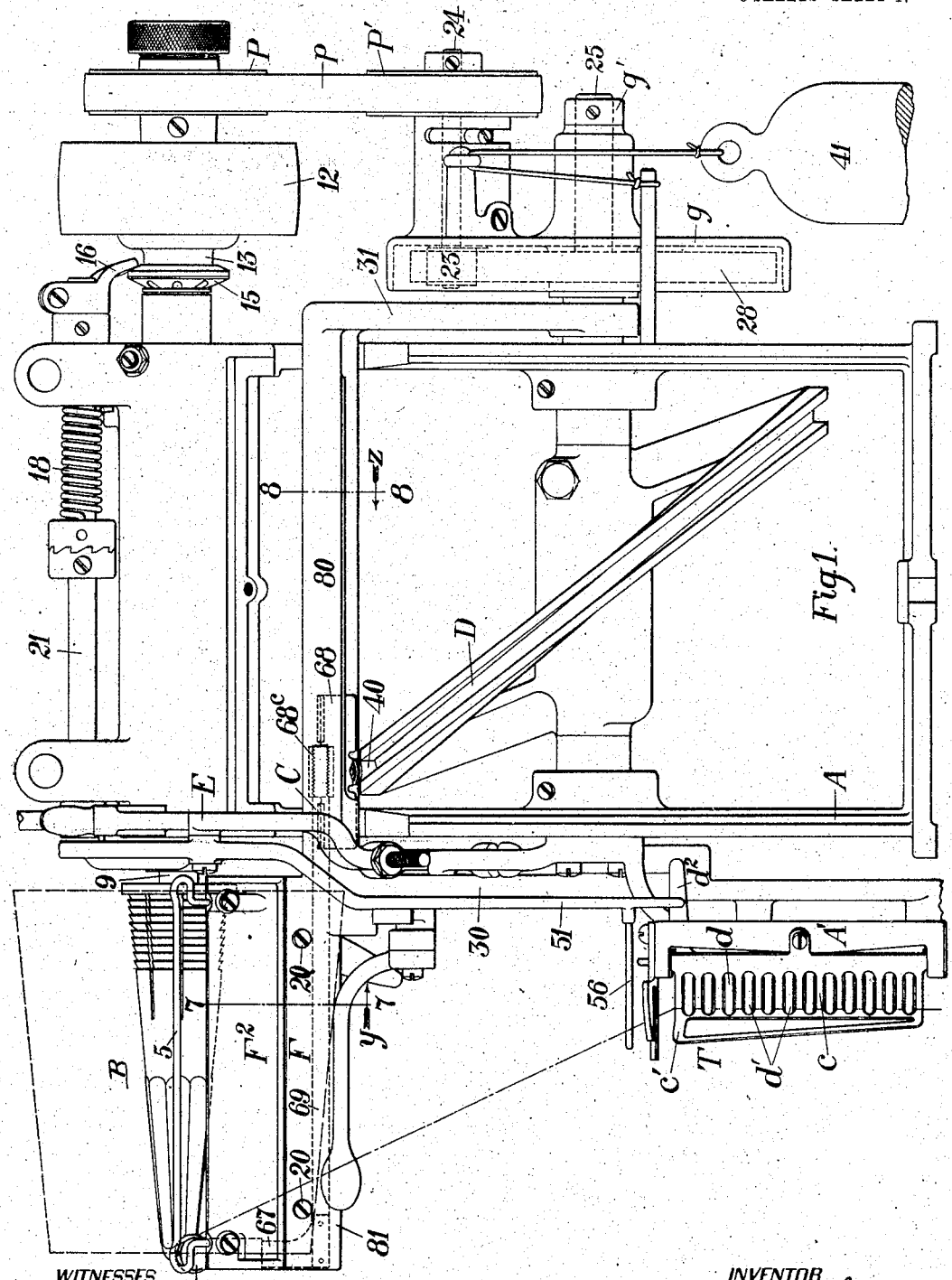
Figure 2:
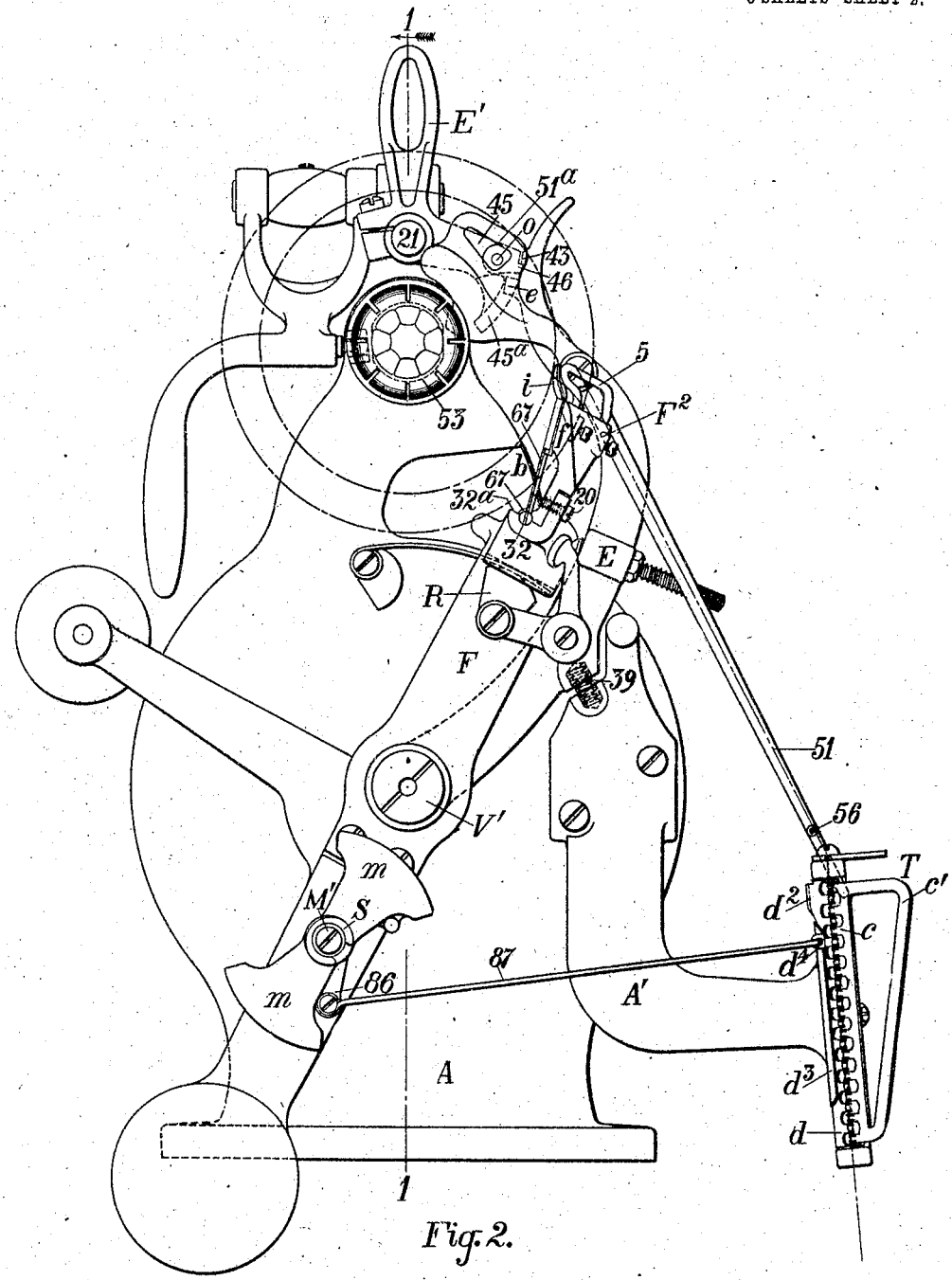
Figure 3:
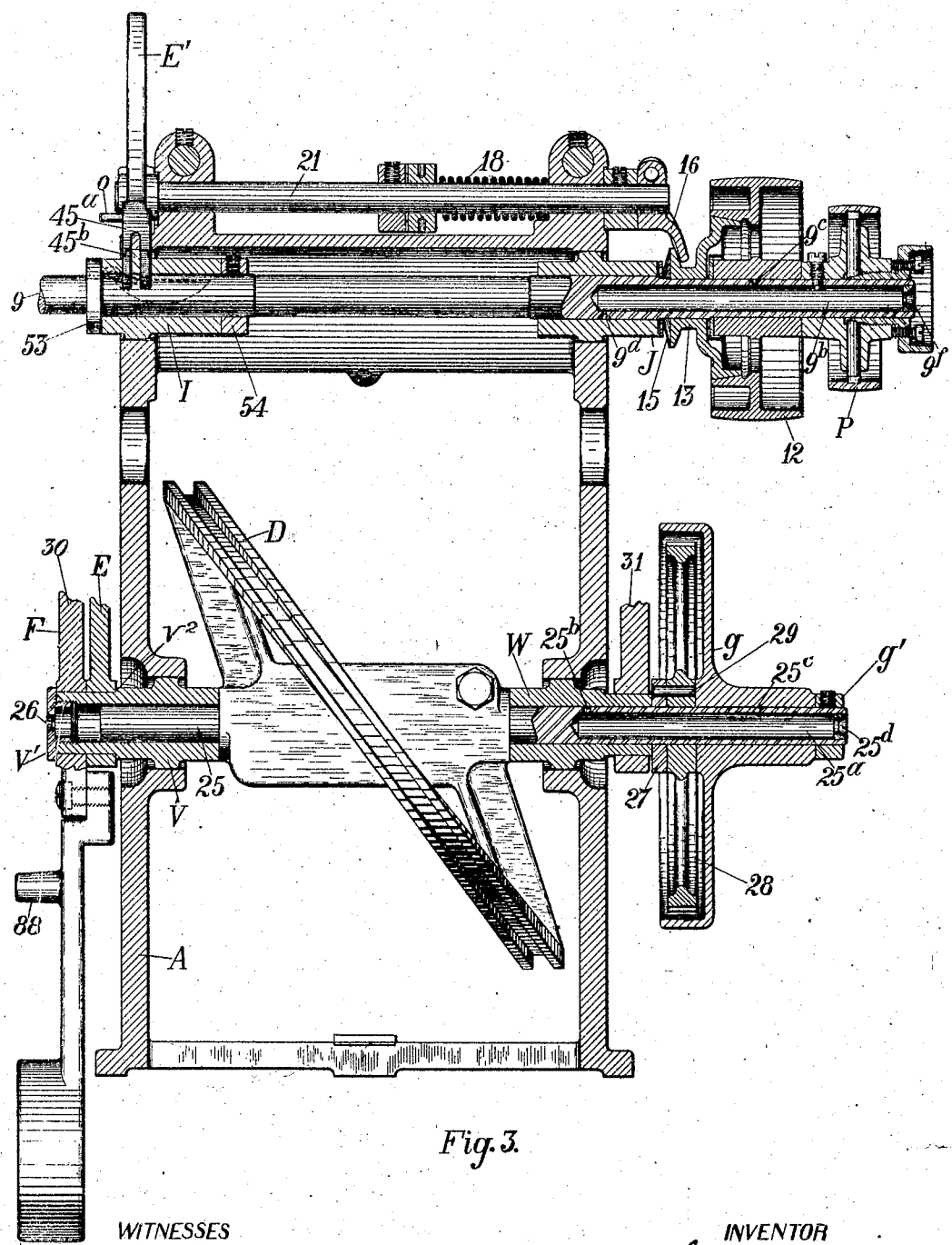
Figure 21:
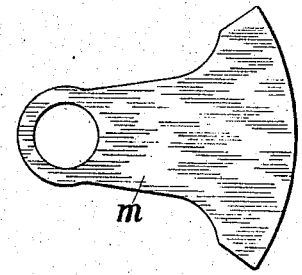
Figures 22, 23, 24:
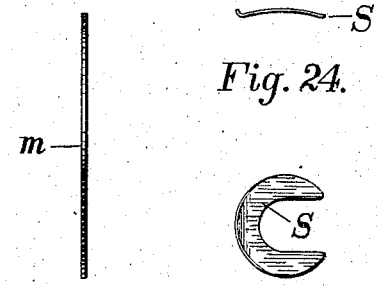
Figure 18:
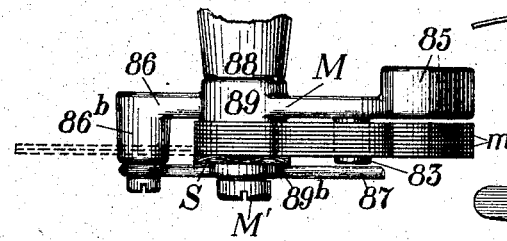
Figure 20:
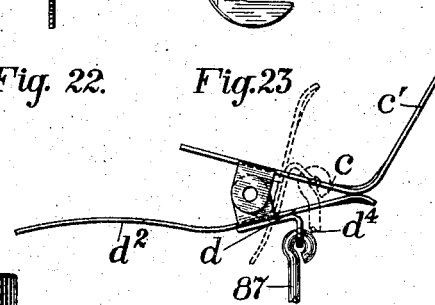
Figure 17:
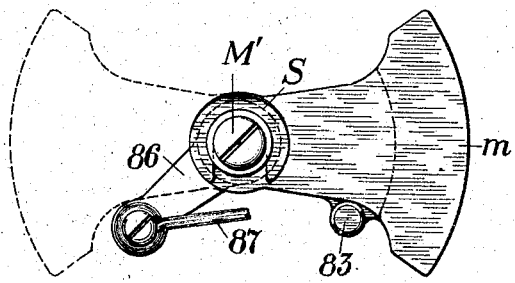
Figure 19:
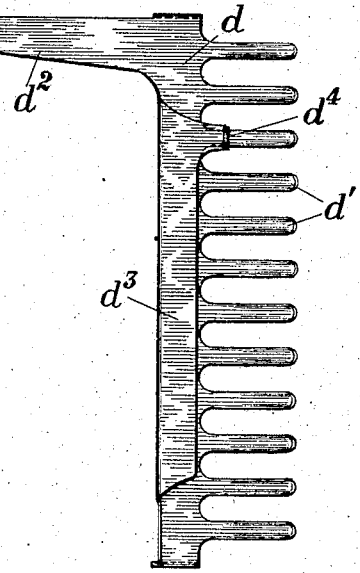
Figure 30:
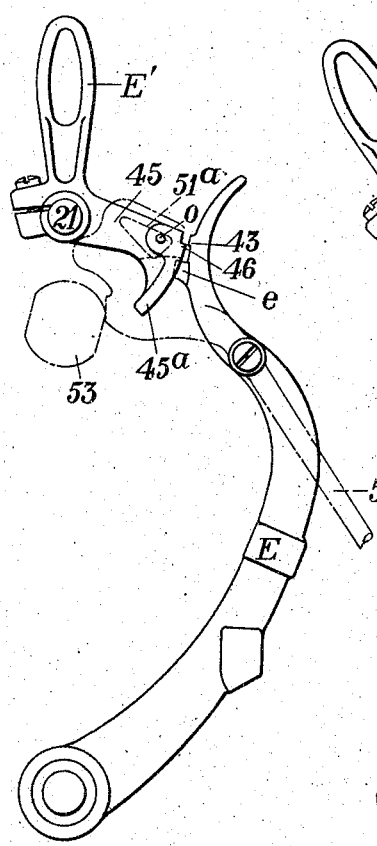
Figure 31:
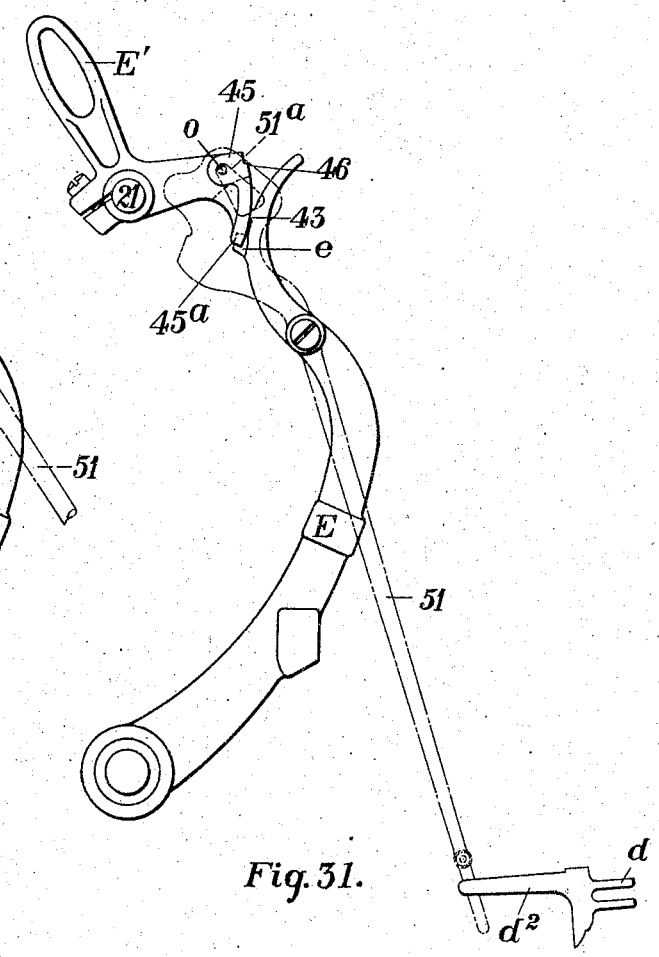

In the accompanying drawings, Figure 1 is a front view of a machine embodying a preferred form of my invention; Fig. 2, an end elevation showing the variable-tension device; Fig. 3, a part sectional view on the line 1 1, Fig. 2, looking in the direction of the arrow; Fig. 4, a plan view of the guide-plate for winding conical cops; Fig. 5, an end elevation of the same; Fig. 6, a longitudinal elevation of the same; Fig. 7, a plan view of the straight guide-plate for winding cylindrical cops; Fig. 8, an end elevation of the same; Fig. 9, a longitudinal elevation of the same; Fig. 10, a view showing the traverse-bar in detail; Fig. 11, a plan view of the thread-guide carrier for winding conical cops, showing a portion of the traverse-rod and method of attaching the two; Fig. 12, a plan view of the thread-guide carrier for winding cylindrical cops and also showing a portion of the traverse-rod; Fig. 13, an end view of the opposite end of the traverse-bar, showing the traverse-slide; Fig. 14, a view showing the back of a thread-guide; Fig. 15, a side elevation of the same; Fig. 16, a section of the body portion of the thread-guide and of the guide-holder on the line 2 2, Figs. 14 and 25; Fig. 17, an elevation of the tension-varying device in detail; Fig. 18, a plan view of the same; Fig. 19, a view of the movable tension-comb; Fig. 20, a plan view of the same, showing its relation to the fixed comb when in operative position; Fig. 21, a front elevation of one of the tension-weights; Fig. 22, a side elevation of the same; Fig. 23, a front elevation of the retaining-spring for the tension-weights; Fig. 24, a side elevation of the same; Fig. 25, a view of the guide-holder and the button-guide; Fig. 26, a side view of the same; Fig. 27, a section on the line 3 3, Fig. 10, showing the limiting-ear of the guide-carrier; Fig. 28, a section on the line 7 7, Fig. 1, looking in the direction of the arrow $y$; Fig. 29, a section on the line 8 8, Fig. 1, looking in the direction of the arrow $z$. Figs. 30 and 31 are detail views showing the detent E, the handle E', and the relation of the same with the end stop-lever 51.

The machine is in general structure of a well-known type, comprising a winding-spindle, a cam, a swinging frame, a guide carried by said frame in appropriate guideways in which it is reciprocated through appropriate connections by said cam, and devices for controlling the speed relation of the winding-spindle and the reciprocating guide. For this general structure I claim nothing herein, for it is well known to those versed in the art of winding and has been described in detail in Patents Nos. 536,672, 567,871, 649,088, and in other patents for winding attachments and devices.

My invention relates to certain improved features, which will be hereinafter described.

For convenience the various members of the winding-machine and their relation are recited.

The winding-spindle 9 and the cam-shaft 25 are supported in appropriate bearings in the main frame A. The winding-spindle is withheld from end play by means of the collar 53, made integral with the spindle and abutting one end of the bearing or box I, and by the collar 54 fastened to the spindle by a set screw at the opposite end of the bearing I. On the right-hand end of the spindle as viewed in Fig. 3 are supported the driving-pulley 12, with its clutch connection to the spindle, and the expansible pulley P, by which is controlled the ratio of the speed of the spindle to that of the reciprocating guide. The clutch 13 is of the ordinary friction type, pressed into operative engagement with the driving-pulley by a cup-shaped spring 15 and having at the end of its hub a beveled rim whereby it can through the action of the clutch-lever 16 be withdrawn from engagement with the driving-pulley. The clutch-lever 16 is attached to the shaft or rod 21, which can be rocked in appropriate bearings in the frame A. The spring 18 tends to rock the shaft 21 to cause the engagement of the clutch-lever 16 with the clutch to withdraw the latter from engagement with the driving-pulley to stop the winding. The driving-pulley 12 is free to rotate on the winding-spindle and entirely independent thereof, save through the friction-clutch 13. The latter is carried on the winding-spindle on keys or splines, which connect it with the spindle rotatively, but permit it to slide longitudinally to be engaged with or disengaged from the driving-pulley. By rocking the handle E' in the opposite direction from that indicated by the arrow, Fig. 2, the clutch-lever 16 is disengaged from the clutch 13, and the latter is forced by the action of the cup-shaped spring 15 into engagement with the driving-pulley 12. To retain the handle E' in this position, a detent E is provided, supported to swing on the bushing V, in which the shaft 25 has a bearing, (see Figs. 1 and 3,) and pressed and held in contact with the handle E' by the spring 39. The latter is retained in place in pockets, one in the detent E and the other in the bracket A'.

An important improvement is made in the structure of the detent E and of the handle E'. Heretofore the detent has been supported entirely from the bushing V, and the correct location of the upper end depended entirely on a close fit between the bushing and the hub of the detent. So great is the distance of the top of the detent E from its hub and so short the bearing of the latter on its bushing that a very slight variation at the bearing may cause an extreme divergence from alinement with the handle E'. To obviate this difficulty, the handle E' is made with a portion $45^a$, depending from the lateral arm 45 and having substantially concentric with the shaft 21 a circular face against which the detent E bears. In this depending portion $45^a$ is a slot $45^b$, Fig. 3, and fitted to this slot is a projection $e$ from the detent E, Figs. 2, 30, and 31. By this means the alinement of the abutting portions of the handle E' and of the detent E is assured. The circularly-curved dependent portion is so proportioned that in any position of the handle E' it serves as a bearing for the detent E to prevent an excessive movement of the latter under action of the spring 39. At the extremity of the lateral extending arm 45 of the handle E' is a catch or shoulder 46, which is engaged by a corresponding catch 43 on the detent E. These catches or shoulders whereby the handle E' and its detent E engage are formed by machining operations directly in the body of the pieces instead of by inserting pins or blocks, as has been done on other machines. The advantage of the new form over the old structure lies in the fact that the shoulders or catches can be machined in exact correct alinement and relation with the members in which they are cut, a condition not always attained with inserted pieces.

The cam D is supported on its shaft 25 and secured thereto by appropriate means. The shaft 25 is supported in bearings in the main frame A and extends outward from the right-hand side of the machine (as viewed in Figs. 1 and 3) to support the gearing and other connections intermediate the cam and the winding-spindle. Just outside of the bearing W is the collar 27, shrunk upon the cam-shaft. In the hub of the gear 28 is secured a pin 29, Fig. 3, which projects sufficiently from the face of the hub to enter a hole in the collar 27 to positively connect the gear 28 rotatively with the cam-shaft. The gear 28 is retained in place by the frame or cover $g$, which in turn is held in position by the collar $g'$. The advantage in thus securing the gear is twofold. First, it is effective. The gear cannot possibly slip rotatively, as sometimes occurs when it is fastened by a pinch or binder screw. The distribution of metal in the hubs and arms of the gear is such that a binder-screw can be effectively tightened only with great exertion and then only when the gear fits its shaft closely. The length of bearing of the hub of the gear on the shaft is so short as compared with the diameter of the latter that to employ a set-screw fastening is inexpedient. Unless the hub of the gear fits the shaft very closely a set-screw will tend to throw it "out of true" to tilt it into a position inclined to the shaft. Second, any change of gears can be readily effected. To make such a change it is necessary only to remove the cover or frame $g$, slide the gear from its shaft, and replace it with a new one of the appropriate size by slipping it onto the shaft and engaging the pin 29 with the collar 27. The cover or frame $g$ swings upon the cam-shaft 25, as indicated in Fig. 1, and is provided with bearings for the shaft 24. To one end of the shaft is attached the pinion 23, adapted to mesh with the cam-shaft gear 28. To the opposite end of shaft 24 is attached the pulley P', in line with the expansible pulley P on the winding-spindle 9, to be driven therefrom by the belt $p$, which is kept taut by the weight 41.

The traverse-bar C, on which the reciprocating guide is carried, is of novel composite structure, (see Fig. 10,) comprising the traverse-slide 68, in the form of a slide or crosshead, the traverse-rod 69, attached thereto by a screw-threaded connection at one end and having at the opposite or outer end a lateral arm or guide-carrier 67. The traverse-slide 68 is a light sheet-metal member, having laterally-extended lugs $68^a$, fitted to corresponding guideways in the traverse-frame F, a lug $68^b$ to support the cam-roll 40 and its stud, and a cylindrically-formed projection $68^c$, internally threaded to receive the end of the traverse-rod 69. The latter is so fitted to the traverse-slide that it can turn freely, but without play, in the portion $68^c$ to permit the rod to be rocked in the manner and for the purpose hereinafter set forth. The pitch of the screw-thread is so slight that the slight rocking of the rod in its bearings does not materially affect the length of the traverse-bar. The guide-carrier 67, which supports the thread-guide, is also formed from sheet metal and fastened by appropriate means to the traverse-rod 69. As indicated in Figs. 10, 11, 12, and 27, it is fitted to a slot in the end of the rod and riveted and brazed in place. The upper end of the guide-carrier is suitably formed to receive and retain the thread-guide. The latter may be a single piece of appropriately-formed material, as indicated at $i$ in Figs. 14 and 15, or may comprise, as shown in Figs. 25 and 26, a holder $j^2$ and a button-guide $j$, fitted thereto and formed of glass, porcelain, steel, or other suitable material. The shank of both the guide $i$ and the holder $j^2$ is formed to fit the upper part of the arm 67 and is preferably of dovetail form, as indicated by the sectional view of the guide in Fig. 16. Heretofore in the type of machine described the portion of the traverse-bar corresponding to the arm or carrier 67 has borne directly on the traverse-frame and in consequence has been subjected to wear. In my new structure the arm 67 does not bear at all on the traverse-frame, but the face $i^2$ of the shank of the guide $i$ or the face $j^5$ of the shank of the guide-holder $j^2$ so bears. The wear is thus sustained by a member which is much less expensive to replace than the arm 67 and which in the case of the guide $i$ must be replaced periodically anyway, because of wear due to the abrasive action of the thread running through it.

The traverse-frame, in which the traverse-bar C is supported, comprises two legs 30 and 31, which straddle the cam and are mounted on the bushings in which the cam-shaft has its bearings, and a cross member 80, which ties the upper ends of said legs and projects beyond one of them outward from the front of the machine. The bushing W, which supports one leg 31 of the traverse-frame, serves only to support and has no provision to prevent end play of the traverse-frame. The bushing V is formed with a shoulder $V^2$, between which and the head of the cap $V'$ are supported and retained from movement longitudinally of the bushing the other leg 30 of the traverse-frame and the detent E. In the portion 80 (see Fig. 29) of the cross member, which is located between the two legs of the traverse-frame, are cut the guideways for the traverse-slide, which consist of a slot 34 for the body of this member, so cut that the axis of the cam-roll 40 shall be radial with the axis of the cam, and a slot 33 at right angles thereto to receive the guide-lugs $68^a$. The overhanging portion 81 of the cross member shown in section in Fig. 28 contains a circularly-formed channel 32 for the traverse-rod 69 and is made to accommodate the guide-plate $F^2$ or $F^3$, whichever is used. These plates are made separable from the traverse-frame F and secured thereto by suitable means, such as the screws 20 20. The bottom edge of the guide-plate is of circularly-concave form, of the same radius as the groove or channel 32, in which the traverse-rod 69 travels in the traverse-frame, and serves to partially encompass the latter to retain it in place. The upper part of the guide-plate has a face $f$ or $f'$ of the appropriate form to direct the reciprocating guide and against which the latter bears. The guide-plates are made of various forms to suit the different forms of package to be wound. When cylindrical packages or "tubes," as they are usually designated, are to be wound, the guide-plate $F^3$, Figs. 7, 8, and 9, with a flat plane face $f'$, is employed to direct the thread-guide in a path parallel to the winding-spindle. When cones are to be wound, the plate $F^2$, Figs. 4, 5, and 6, with a formed face $f$, is employed to direct the thread-guide in a path parallel to the proximate face of the package. By this means the machine can be readily adapted to wind interchangeably tubes or cones. When winding any other packages than cylindrical ones, the upper part of the guide-carrier 67 must be formed to accommodate the surface $f$ of the guide-plate, as shown in Fig. 11. When winding cylindrical cops, the guide-carrier employed is formed with its upper part in line with the traverse-rod, as shown in Fig. 12, to adapt the guide to travel parallel to the axis of the winding-spindle following the surface $f'$. To prevent excessive rocking of the guide-carrier away from the traverse-frame back, a lip $67^b$, Figs. 11, 12, and 27, is formed at its bottom, which acts as a stop, striking on the surface $32^a$, Figs. 2 and 28. Should such excessive movement occur, the top of the guide would catch in the package being wound and cause damage to both machine and package. When a thin-formed guide like that indicated in Fig. 14 and Fig. 15 is employed, the thread is carried over and supported by the bail 5, (shown in Fig. 1,) suitably attached to the traverse-frame back.

To prevent the traverse-frame F from returning toward the winding-spindle from any point to which it has been pushed by the increasing diameter of the package being wound, I provide a detent R, similar to the one described in my United States Patent No. 690,492, dated January 7, 1902.

The tension devices are of the general character usually employed with this type of machine, consisting of alternating sets of bars or fingers. One of these sets, the fixed tension $c$, is in the form of a grid, with a substantially triangular thread-guiding portion $c'$ suitably formed to direct the thread to its appropriate position. The swinging tension $d$ is made in the form of a comb, with teeth $d'$ adapted to swing between the bars of the fixed tension and having a lateral arm $d^2$ appropriately posed to be struck by the end stop-lever 51 to swing the tension-comb on its pivot-pin to open the tensions to receive the thread. When thus opened, the swinging tension takes the position indicated by the dotted lines in Fig. 20. The swinging tension is acted upon to press the thread between it and the fixed tension by means of the device illustrated in detail in Figs. 17 and 18 and shown applied to the machine in Fig. 2. This device or weight-holder M is connected with the swinging tension by means of the connecting-rod 87, attached to the eye $d^4$, formed integral with the tension-comb. To resist the blow of opening the tensions and the stress due to the pull of the weights on the holder M, the back is reinforced by the fold $d^3$, of which the eye $d^4$ is a part, Fig. 19. The weight-holder M is pivotally supported by the stud M' on the boss 88 of the swinging traverse-frame F, and consists of the arm 86, to which the connecting-rod 87 is attached, and of the counterweight portion 85. The hub 89 of the weight-holder is reduced to receive the sheet-metal weights $m$, which are held in place on the hub by spring S, Fig. 17 and Fig. 18. The spring S is of the yoke form indicated in Figs. 23 and 24 and is adapted to fit a narrow circular groove $89^b$, cut near the end of the hub, Fig. 18. The hub $86^b$, to which the connecting-rod 87 is secured, and the projection 83 serve as stops to limit the movement of the weights $m$ on the holder. Preferably a sufficient number of weights $m$ are employed to counterbalance the portion 85 when they are swung over against the hub $86^b$ to the position indicated by the dotted lines in Figs. 17 and 18. When the weights $m$ are in the position thus indicated, no pressure is brought upon the movable set of fingers or comb to apply tension to the thread. By swinging the weights over to the position indicated by the full lines in Fig. 17 any desired degree of tension can be produced, depending on the number of weights so shifted. The action of this device on the tension is as follows: As the thread-guide $i$ swings away from the winding-spindle the stud M', which supports the weight-holder, is swung away from the tension, causing the weights $m$ to rise and to act on the tensions with constantly-decreasing leverage, thereby producing a diminishing tension on the thread.

The automatic tension-opening device is of novel and improved structure. The tensions are automatically opened from the stopping devices through the end stop-lever 51. The latter is a lever pivoted to the detent E and having a weighted upper end adapted to engage when dropped with the collar 53 on the winding-spindle 9. The collar 53 is flattened on two opposite sides, (see dotted lines, Fig. 2,) and the cam-surface thus formed when engaging the end of the lever 51 forces the detent E outward to release the handle E' through disengagement of the shoulders or catches 43 and 46. When the handle E' is released, the rod 21 is caused to rock to stop the machine in the manner heretofore described. The weighted end of the lever 51 is formed with a substantially triangular opening $51^a$, through which projects the pin $o$ from the arm 45 of the handle E'. The opening is of such size and so proportioned as to permit the lever 51 to reach and engage with the collar 53, as described. The long downwardly-extending arm of the lever 51 is of sufficient length to reach and engage the arm $d^2$ on the movable tension. Near the end of the long arm is inserted a pin 56, over which the thread draws on its way from the tensions to the winding-spindle. The tension of the thread drawing over this pin prevents the lever 51 from tilting to cause the stopping of the winding. When this tension is removed, either by the breakage of the yarn or by the exhaustion of its supply, the lever 51 is released and its weighted upper end drops, acting to stop the winding, as above described. When the handle E' is released from engagement with the detent E, it is rocked by the spring 18 in the direction of the arrow, Fig. 2, causing the pin $o$ to rise, carrying with it the weighted upper end of the lever 51. The opposite extremity is depressed and, striking the arm $d^2$, opens the tension-fingers to admit the thread, as indicated by the dotted lines in Fig. 20. When the handle E' is again thrown into engagement with the detent E, the pin $o$ is depressed, permitting the lever 51 to resume its normal position. The extremity of the long arm of the lever 51 rises, permitting the tension-fingers to be closed upon the thread by the action of the weights $m$.

Some trouble has been experienced in threading finger-tensions owing to the fact that the yarn frequently delivers from the supply with kinks and short bends in it. When the yarn is laid in the tensions, some portions lie outside the ends of the fingers owing to said kinks and bends. To obviate this, it has been customary to straighten the yarn in the tensions by hand before starting the winding. This trouble I have overcome by inclining the tensions at a slight angle. The thread in being drawn into the tensions over the bottom finger or bar has sufficient tension to straighten out any ordinary kinks and bends, and is thus laid in its appropriate position straight and smooth, so that when the movable fingers are closed upon it no portion shall lie outside of the fingers.

Improved provision is made for the lubrication of running parts, as follows: The winding-spindle is provided with an axial bore $9^b$ at its rear end, Fig. 3, extending from the end as far as and into the main bearing J in the frame. The outer end of this bore is partially closed by suitable means, as by the plug $9^f$, to form a chamber for the reception of lubricant. Radial outlets $9^c$ and $9^d$ from this bore lead to the bearing of the driving-pulley and to the main spindle-bearing in the frame. The plug $9^f$ or other device which closes the bore to form the chamber has a central opening through which the nose of an oil-can may be introduced to fill the chamber or reservoir. The rear end of the cam-shaft is oiled by a similar device, there being shown an axial bore $25^a$, closed by a plug $25^d$, and radial outlets $25^b$ and $25^c$. The front end of the cam-shaft does not extend through its bushing or bearing V, the outer end of which is closed by means of the screw-cap V'. This cap serves a double purpose, for, besides closing the end of the cam-shaft bushing to form a reservoir or chamber, its head serves to hold the hubs of the traverse-frame F and of the detent E in place. This cap is likewise pierced with a central axial opening 26, through which the nose of an oil-can may be introduced.

The device for securing to the winding-spindle the tubes on which the material is wound may be of any desired and appropriate structure. The machine is shown in the drawings equipped with a novel and effective device, (indicated by B,) shown and described in my United States Patent No. 690,493, dated January 7, 1902; but other devices may be applied. The traverse structure is, however, peculiarly adapted for use with those forms of tube-holder which are to be attached rigidly to the winding-spindle to be rotated integral and coaxially therewith.

The expansion-pulley P, herein referred to, is not specifically described herein, being substantially the same as that shown and described in my United States Letters Patent No. 690,494, dated January 7, 1902.

When cylindrical packages are to be wound, the cone tube-holder may be removed and in place thereof appropriate devices for holding cylindrical tubes may be substituted—as, for instance, a cylindrical extension member such as is described in my Patent No. 652,572.

By employing the devices herein described the changes required to convert a cylindrical winder to a cone-winder, and vice versa, are readily made and without entailing special care to insure that adjustments are carefully attended to. In fact, certain specific parts are required to produce each form of package, and the only care required is to see that these parts are properly secured in position. This having been accomplished there is no adjustment to be made to take up play or backlash.

The composite traverse-bar structure is advantageous, as it inures to more economical manufacture and maintenance. Each of the component pieces is smaller and simpler to manufacture, and in case any one member of the traverse-bar wears out or for any reason must be replaced it is unnecessary to discard the whole bar, but only the particular portion which requires replacement. Further, the composite structure of the bar permits a lighter structure to be employed, thus admitting a higher speed of winding than heretofore. Again, the wearing-surfaces of the traverse-bar and of the guideways in which it travels are so disposed as to submit the traverse-bar to the least amount of wear. The greatest amount of wear on the bar is sustained at the end which supports the thread-guide. Heretofore this wear has been borne in part by a small guide-lug, which maintained the guide end of the traverse-bar from vertical displacement, and by the guide-carrying arm or member, which bore against the back of the traverse-frame during the reciprocation of the guide. The vertical wear is now extended over a greater area by the employment of the traverse-rod running in its channel-bed, and the wear incident to the pressure of the guide against the surface of the package is sustained by the guide itself instead of by the traverse-bar, as has already been pointed out.

The new arrangements and structures employed in connection with the starting and stopping devices are much simpler than those heretofore employed and less liable to derangement. The variable tension devices are simpler to adjust and more susceptible of close and delicate adjustment. The weights are secured to the weight-holder, so that they may not become displaced and lost, and in order to increase or to diminish the amount of tension desired it is simply necessary to shift the requisite number of weights from one side of the holder to the other.

Referring again to the traverse-bar the composite structure admits a certain amount of adjustability, which could not be obtained when the solid bar was employed. In the economical manufacture of machines and of machine parts it is impossible to hold closely to assigned dimensions. Limits of variation are allowed from said dimensions, and it sometimes happens that the variations all occur in one direction or otherwise so combine that an ultimate cumulative error occurs of material magnitude. In case extreme accuracy is required in the location of the thread-guide relative to the winding-spindle such accumulated variations may be compensated for by screwing the traverse-rod a greater or less distance into the traverse-slide.

While I have specifically described and illustrated the preferred embodiments of my invention, it is to be understood that I do not limit my invention thereto, as they may be varied by those skilled in the art to adapt them to particular uses and combinations, and it is further to be understood that while I have shown the various features as combined and operating in a preferred form of organized machine the various features may be used separately or in combination with other features or with other equivalent features wherein they have the same general mode of operation or produce the same general results.

What I claim is—

1. The combination in a winding-machine with a winding-spindle, a reciprocating guide, and a cam, of a frame movable to and from the winding-spindle, a reciprocating traverse-bar mounted solely in the movable frame to be moved therewith to and from the spindle, and a guide holding or carrying member of the traverse-bar adapted to oscillate to and from the spindle with each reciprocation of the traverse-bar, and with a motion independent of and distinct from the motion of the frame and of the whole traverse-bar, substantially as described.

2. The combination in a winding-machine with a winding-spindle, a cam, a composite traverse-bar comprising a slide formed from sheet metal and having a cylindrical bearing, a rod rotatively attached by one end to the said cylindrical bearing, and a guide-carrying member rigidly attached to the opposite end of the rod, of a frame movable to and from the winding-spindle having appropriate guideways to receive the sheet-metal slide and the rod, and a plate to support the guide-carrying member, substantially as described.

3. The combination in a winding-machine of a winding-spindle, a reciprocating thread-guide, a frame movable to and from the winding-spindle, a traverse-bar solely supported and reciprocated in the movable frame, an oscillating guide-carrying member of the traverse-bar and a removable plate for the movable frame, to support and direct the movement of said oscillating guide-carrying member, substantially as described.

4. In a winding-machine, the combination with a winding-spindle, a cam, a reciprocating guide, a traverse-bar to carry and reciprocate the guide and composed of a traverse-slide, a traverse-rod rotatively connected with the traverse-slide and a guide-carrying member rigidly attached to the traverse-rod, of a frame to solely support the traverse-bar and movable therewith to and from the winding-spindle, said frame having guideways to receive the traverse-slide, a groove of appropriate form to receive the traverse-rod and a removable guide-plate having a bearing-face for the thread-guide to support and direct the guide-carrying member, and further adapted to prevent displacement of the traverse-rod from its groove, substantially as described.

5. The combination in a winding-machine with a winding-spindle, a reciprocating guide and a cam, of a frame movable to and from the spindle, a rod supported and longitudinally reciprocated in said frame parallel to the winding-spindle, a cross-head or slide attached to one end of the rod and adapted to be reciprocated from the cam, a guide-carrying member attached to the opposite end of the reciprocating rod, and a plate, separably connected to the movable frame, to support the guide and retain the reciprocating rod in its bearings in said movable frame, substantially as described.

6. The combination in a winding-machine with a winding-spindle, a reciprocating guide and a cam, of a slide or cross-head connected with the cam, a rod connected with the slide, a swinging traverse-frame having guideways for the slide and a channel for the rod, a removable section of the traverse-frame to prevent displacement of the rod from its channel, and devices connected with the rod to carry the reciprocating guide, substantially as described.

7. The combination in a winding-machine with a winding-spindle, a reciprocating guide, a cam, and a frame movable to and from the spindle, of a reciprocating slide or cross-head carried solely in the movable frame and connected with the cam, and a member to carry the reciprocating guide connected with the cross-head and adapted to be oscillated, during the winding, toward and away from the winding-spindle, independently of its movement with the traverse-frame, substantially as described.

8. The combination in a winding-machine of a winding-spindle, a reciprocating guide, a traverse-bar, to reciprocate the guide comprising a cross-head, traverse-rod, and a guide-carrier adapted to be oscillated during its reciprocation, to and from the winding-spindle, a cam to reciprocate the traverse-bar, and a frame to solely support the traverse-bar, swung coaxially with the cam, substantially as set forth.

9. The combination in a winding-machine of a winding-spindle, a reciprocating guide, a traverse-bar to reciprocate the guide comprising a cross-head, a traverse-rod, and a guide-carrier adapted to be oscillated, during its reciprocation, to and from the winding-spindle, a cam to reciprocate the traverse-bar and a movable frame to solely carry the latter, adapted to be moved, with the traverse-bar, to and from the winding-spindle, and so posed, relative to the cam, that the cam shall be maintained in operative connection with the traverse-bar during the winding, substantially as described.

10. The combination in a winding-machine with a cam, a longitudinally-reciprocating traverse-rod driven by the cam, and a cross-head connecting the rod with the cam, of a movable traverse-frame to carry the traverse-rod and maintain it in operative relation to the cam, comprising two legs 30 and 31, adapted to straddle the cam and to be swung concentrically therewith, a section 80 which joins the tops of the legs and in which are the guide-slots 33 and 34 to receive the cross-head, and an overhanging section 81 in which is a single channel 32 to receive the traverse-rod.

11. The combination in a winding-machine with a cam, a longitudinally-reciprocating traverse-rod driven by the cam, a guide-carrier fastened thereto, a thread-guide carried thereby, and a cross-head connecting the rod with the cam, of a movable traverse-frame to support the traverse-rod and maintain it in operative relation to the cam, comprising two legs 30 and 31, adapted to straddle the cam and to be swung concentrically therewith, a section 80 which joins the tops of the legs and in which are the guide-slots 33 and 34 to receive the cross-head, and an overhanging section 81 in which is a channel 32 to receive the rod, and a removable plate $F^2$ whose bottom edge is formed and secured in such relation to the channel 32 as to retain therein the reciprocating traverse-rod, and whose upper portion is formed to support and direct the thread-guide substantially as described.

12. The combination in a winding-machine, with a rotary spindle, of a swinging guide-carrying frame, a traverse-bar reciprocating in grooves therein, a guide carried by the traverse-bar, and means attachable to the guide-carrying frame to direct the traverse of the guide, substantially as described.

13. The combination with a winding-spindle of a guide-carrying frame, a traverse-slide reciprocating in grooves in said frame, a guide-carrier, a thread-guide carried thereby, and a connection between the traverse-slide and the guide-carrier such that the thread-guide may be reciprocated in a path either parallel with or inclined to the axis of the winding-spindle, substantially as described.

14. The combination with a rotary spindle in a winding-machine, of a guide-carrying frame, a guide, a guide-carrier, a traverse-slide, a rod supporting the guide-carrier rigidly therewith, and means to connect said rod with the traverse-slide to allow said guide to oscillate, substantially as described.

15. The combination in a winding-machine with frame A, of a spindle rotating in bearings in said frame, a cam supported to be driven from said spindle, controlling devices for regulating the speed of the cam with relation to that of the winding-spindle, a guide-carrying frame F mounted to rock concentric with the axis of the cam, a traverse-slide sliding in grooves in the said frame and reciprocated by said cam, a guide-carrier and a guide carried thereby, a rod 69 connecting the traverse-slide and the guide-carrier, and sliding in a groove in the frame F, a plate to support the guide and its carrier, suitably formed at its bottom edge to retain the rod in position in its groove in the frame F, and so connected to the frame F as to be easily detached in the manner and for the purpose described.

16. In a traverse-bar for a winding-machine, a traverse-slide or cross-head 68 formed of sheet metal with the guide-lugs $68^a$ $68^a$, the lug $68^b$ to which is attached the cam-roll 40, and the cylindrical portion $68^c$, the rod 69 rotatively connected with the slide in said cylindrical portion, and a guide-carrying member 67 attached to the traverse-rod, substantially as described.

17. In a traverse-bar for a winding-machine, a traverse-slide or cross-head 68, formed from sheet metal with guide-lugs $68^a$ $68^a$, a lug $68^b$ to which is attached the cam-roll 40, and a cylindrical portion $68^c$, internally threaded, a rod 69 threaded at one end to fit said cylindrical portion of the traverse-slide, and a guide-carrying member 67 attached to the opposite end of the rod 69, substantially as described.

18. In a traverse-bar for a winding-machine, a traverse-slide or cross-head 68 formed from sheet metal with guide-lugs $68^a$ $68^a$, a lug $68^b$ to which is attached the cam-roll 40 and a cylindrical portion $68^c$, a rod 69, with one end adjustably secured in the cylindrical portion of the traverse-slide 68 so that the extreme length of the traverse-bar may be varied and a guide-carrying member secured to the opposite end of the traverse-rod 69, substantially as described.

19. In a traverse-bar for a winding-machine, a traverse-slide or cross-head 68 with guide-lugs $68^a$ $68^a$, a lug $68^b$ to carry a cam-roll 40, and a cylindrical portion $68^c$, a traverse-rod 69 joined by one end to the traverse-slide 68 at the cylindrical portion $68^c$, a guide-carrying member 67 attached to the opposite end of the traverse-rod and having its upper portion formed to carry a thread-guide, substantially as described.

20. In a winding-machine, a winding-spindle, a cam, a replaceable reciprocating guide driven from the cam, a frame movable to and from the spindle and having a guide-plate to support the guide, a traverse-bar solely carried and reciprocated in said frame, and having a guide-carrying member formed to so carry the guide that the latter shall bear against the guide-plate aforesaid and sustain all wear therefrom, substantially as described.

21. In a winding-machine, the combination with a winding-spindle, and a reciprocating guide, of means for operating and for starting and stopping the machine, comprising a driving-pulley 12 mounted to turn freely on the spindle, a clutch 13 rotatively secured to the spindle and pressed into connection with the pulley by the spring 15, a lever 16 operated by a spring 18 to withdraw the clutch from the driving-pulley, a handle E' to rock the lever 16 having a lateral extension 45 and a depending curved portion $45^a$ in which is a slot $45^b$ and a shoulder 46, a detent E held by the spring 39 in contact with and limited in its movement by the said depending curved portion $45^a$ of the handle E' and having a projection $e$ engaging the slot $45^b$ of the handle E' to hold said handle E' and detent E in alinement, and a shoulder 43 to engage the corresponding shoulder 46 on the extension 45 of the handle E', substantially as described.

22. In a winding-machine, a winding-spindle, a reciprocating guide, a cam to reciprocate the guide, starting and stopping devices to control the winding, and detents for maintaining the winding-machine in operation, comprising a spring-pressed detent E, having a projection $e$ and a detent-shoulder 43, and a handle E' with a depending curved portion $45^a$ against which the detent E bears, and by which it is limited in its movement, and in which is formed a detent-shoulder 46 to correspond and engage with the detent-shoulder 43 in the detent E, and in which is also a slot $45^b$ to engage the projection $e$ of the detent E to prevent lateral play in the top of the latter, substantially as described.

23. The combination in a winding-machine with a winding-spindle, reciprocating guide, and starting and stopping devices which include a handle E', and detent E, of tensions and means for mechanically opening and closing the tensions, comprising with the fixed tension member $c$ and movable tension member $d$, an arm $d^2$ fixed on said movable tension member, a lever 51 having an extended arm to operatively engage the movable tension, and having its opposite extremity formed to engage with a pin $o$ attached to the handle E', whereby the lever 51 is shifted to engage the arm $d^2$ of the movable tension to swing it open when the winding is stopped and allow it to be closed upon the fixed tension when the winding is started, substantially as described.

24. The combination with a stop-lever 51 of a winding-machine, of a two-part tension, and an arm $d^2$ integral with one part of the tension adapted to be engaged by the lever 51, to open the tension, substantially as described.

25. The combination in a winding-machine, with a starting and stopping device including a handle E', a projection $o$ from the handle F', a stop-lever 51 formed to engage the projection $o$ to be moved therefrom, and tension devices adapted to be shifted by the lever 51, substantially as described.

26. The combination in a winding-machine with starting and stopping devices including a handle E', a projection $o$ from the handle E', tension devices including a movable member with an extended arm $d^2$ and a lever 51 intermediate the handle E' and the tension devices having one arm adapted to engage the arm $d^2$ of the movable tension member, and in the opposite arm an aperture $51^a$ to engage the projection $o$, whereby the lever 51 is shifted on the rocking of the handle E', to shift the movable tension member, substantially as described.

27. The combination in a machine with starting and stopping devices, of a tension device with a movable member having an extending arm, a handle to operate the starting and stopping devices, and a lever having one arm to engage the movable tension member, and the opposite arm in engagement with the handle of the starting and stopping devices whereby the movable tension member is shifted with the starting and the stopping of the machine, substantially as described.

28. In a tension device, a fixed member having a grid portion formed with cross-bars, and integral therewith an extended portion, formed at an angle with the body of the tension member to direct the thread to its appropriate position on the cross-bars, and a swinging tension-comb whose fingers, passed between the bars of the fixed tension member, press the thread against the bars of the latter to tensionize it, substantially as described.

29. In a tension device, a fixed member with a grid portion of cross-bars and an extended guide portion to direct the thread to its position on the cross-bars, and a swinging tension-comb whose fingers are passed between the bars of the fixed member to be drawn back thereto to press the thread between said fingers and the bars of the grid, an arm integral with the swinging tension whereby the latter can be shifted to open the tensions to receive the thread, or closed upon the thread after it has been introduced, substantially as described.

30. A tension member comprising in one piece, a grid-like body with cross-bars, and an extended portion of appropriate form, bent at an angle with the body of the tension member to guide the thread to its appropriate position in the tensions, substantially as described.

31. A swinging tension member $d$, comprising a comb-like body portion and an arm $d^2$ made integral with the body portion, and whereby the tension member may be swung, substantially as described.

32. A swinging tension member $d$ comprising a comb-like body portion and, made integral with the body portion, an arm $d^2$ whereby the tension member can be swung, an eye $d^4$ whereby a tensionizing agent may be connected, and a reinforce $d^3$ to strengthen the body of the tension member, substantially as described.

33. In a winding-machine, the combination with a tension device, of means for applying a variable tension, comprising a weight-holder, tension-weights so secured to the weight-holder as to be adapted to be shifted thereon to vary the initial amount of tension and means to mechanically shift the position of the weight-holder during the winding, to vary the action of the weights upon the tension device, substantially as described.

34. In a winding-machine, the combination with a winding-spindle 9, reciprocating guide, a tension device T, of a weight-holder pivotally mounted, and connected with the tension device by the connecting-rod 87, a plurality of weights $m$ mounted on the hub of the weight-holder, and adapted to be shifted thereon to regulate the initial amount of tension, and a swinging frame carrying the guide and the weight-holder, and adapted to be shifted in position during the winding, thereby shifting the position of the weight-holder on its pivot, changing the leverage of the weights about said pivot, and gradually varying the effect of the weights on the tension device, substantially as described.

35. The combination in a tension-actuating device, of a weight-holder M adapted to be pivotally mounted, a hub portion 89 with a peripheral groove $89^b$ near its extremity, weights $m$ mounted upon the hub to be swung about it, a spring-fastening S to be snapped into the peripheral groove $89^b$ to retain and to frictionize the weights, and stops 83 $86^b$ to limit the movement of the weights $m$ about the hub of the weight-holder, substantially as set forth.

36. A winding-machine member to support the thread-guide and its reciprocating rod and cross-head, having a portion 80 with guide-slots 33 and 34 to receive the reciprocating cross-head, and a portion 81 in which is a channel to receive and guide the reciprocating rod substantially as described.

In testimony whereof I have signed my name to this specification in the presence of two subscribing witnesses.

SIMON W. WARDWELL.

Witnesses:
EDWARD F. PARKS,
CHARLES A. EDDY.